United States Patent
Louis

(10) Patent No.: US 8,302,744 B2
(45) Date of Patent: Nov. 6, 2012

(54) AUTOMATIC SLACK ADJUSTER ANCHOR UNIT WITH A ONE-WAY CLUTCH

(75) Inventor: John Louis, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 1135 days.

(21) Appl. No.: 12/181,016

(22) Filed: Jul. 28, 2008

(65) Prior Publication Data

US 2010/0018812 A1 Jan. 28, 2010

(51) Int. Cl.
*F16D 65/52* (2006.01)

(52) U.S. Cl. .......... 188/196 R; 188/196 B; 188/196 BA; 188/79.51; 188/79.55; 188/79.56

(58) Field of Classification Search ............... 188/79.51, 188/79.55, 79.56, 196 R, 196 BA, 196 B
See application file for complete search history.

(56) References Cited

U.S. PATENT DOCUMENTS

| | | | |
|---|---|---|---|
| 3,013,638 A * | 12/1961 | Satrum | ...................... 188/79.55 |
| 3,444,758 A | 2/1968 | Svensson et al. | |
| 3,871,495 A * | 3/1975 | Devitt | ..................... 188/79.55 |
| 3,901,357 A | 8/1975 | Reitz et al. | |
| 4,071,120 A | 1/1978 | Hagin | |
| 4,150,735 A | 4/1979 | Acre et al. | |
| 4,380,276 A | 4/1983 | Sweet et al. | |
| 4,561,523 A | 12/1985 | Ott | |
| 4,596,319 A | 6/1986 | Cumming | |
| 4,621,714 A | 11/1986 | Skurka | |
| 4,718,522 A | 1/1988 | Frania et al. | |
| 6,240,806 B1 | 6/2001 | Morris et al. | |
| 7,198,138 B2 | 4/2007 | Chadha et al. | |
| 2007/0012529 A1 | 1/2007 | Kreidler et al. | |

FOREIGN PATENT DOCUMENTS

WO WO 03083322 A1 * 10/2003

OTHER PUBLICATIONS

International Search Report and The Written Opinion of the International Searching Authority mailed Aug. 14, 2009.

* cited by examiner

*Primary Examiner* — Bradley King
*Assistant Examiner* — Mahbubur Rashid
(74) *Attorney, Agent, or Firm* — Crowell & Moring LLP

(57) ABSTRACT

An improved automatic slack adjuster for reducing slack in the brake of a vehicle, in which a one-way clutch assembly is arranged at a side of the automatic slack adjuster housing, and one-way motion-inhibiting pawls in the one-way clutch assembly act on one-way gear teeth disposed on an inner radius of a gear wheel within the assembly whose outer circumference drives a slack adjuster unit. The incorporation of the one-way clutch within the anchor unit of the adjuster provides an automatic slack adjuster which can be produced at a reduced cost, manufactured more easily, and provides for improved adjustment performance with much reduced dependence on the lubricity of grease used.

8 Claims, 4 Drawing Sheets

AUTOMATIC SLACK ADJUSTER ANCHOR UNIT WITH A ONE-WAY CLUTCH

BACKGROUND AND SUMMARY OF THE INVENTION

The present invention relates to brakes used on, for example, commercial truck or trailer axles, and in particular to automatic slack adjusters which eliminate excess motion in a brake actuator mechanism used to apply the brake.

Over the life of the brake linings of a brake, such as a pneumatic drum brake used on commercial vehicle axles, as the brake's friction linings wear, the clearance between the brake linings and their respective friction surfaces (for example, the inner surface of a brake drum) increases. This increasing clearance requires an ever-increasing range of motion from the brake actuator mechanism to move the brake linings from their rest position to the point at which the linings contact the friction surface.

It has become commonplace to include an automatic slack adjuster in the mechanical path between the brake actuator and the brake linings so as to eliminate excess lining travel slack as the brake linings wear. Such adjusters typically are: (i) located on a portion of a brake camshaft which is outside of the brake (typically splined to the camshaft); and (ii) coupled to a pushrod of a brake actuator such that when the brake actuator push rod is extended or retracted, the slack adjuster rotates about the longitudinal axis of the brake camshaft. Thus, by extending or retracting the brake actuator pushrod, the slack adjuster causes the brake camshaft to rotate about its longitudinal axis, which in turn rotates a brake actuation cam affixed to the end of the brake camshaft located within the drum brake. The rotation of the cam either presses the brake linings into engagement with the brake drum inner friction surface or allows the brake linings to withdraw radially inward, away from the friction surface. Because the brake camshaft is used to rotate the cam which presses the brake linings radially outward, the brake camshaft is also known as the brake cam shaft.

Automatic slack adjusters are typically designed to transmit brake actuator force to the brake camshaft in the brake application direction with no relative motion between the adjuster and the brake camshaft. When the brake actuation force is withdrawn, if there is greater than desired distance between the brake linings and the brake drum friction surface, the slack adjuster is permitted to rotate relative to the brake camshaft an angular distance sufficient to remove some or all of this undesired slack, i.e., limiting the distance the brake linings withdraw from the brake drum friction surface so that the lining-drum clearance is maintained at a desired minimum.

In many automatic slack adjusters, a one-way clutch is used to accomplish the rotary adjusting movement, with a worm shaft located in the adjuster turning a worm gear coupled to brake camshaft. When the brake actuator pushrod is retracted, the worm shaft rotates about is longitudinal axis, causing the worm shaft and worm gear to move relative to one another in a circumferential direction about the circumference of the worm gear. This relative movement of the worm shaft and gear creates corresponding relative motion between the slack adjuster body and the brake camshaft. As a result, when the brake actuator pushrod returns to its rest position the brake camshaft does not return to its original rest position. Instead, the brake camshaft only rotates through a smaller angle to a new rest position. The brake application cam thus stops in a corresponding new rest position at which the brake linings are maintained closer to the brake drum friction surface. Because the rotation of the slack adjuster relative to the brake camshaft results in reduction of brake lining clearance in the new rest position, the automatic slack adjuster compensates for brake lining wear.

The one-way clutch mechanism employed in such automatic slack adjusters is usually one of: a wrap spring clutch arranged on an internal diameter of the adjuster, where the spring drives in the unwind direction (an example is the Model AA1 by Haldex Commercial Vehicle Systems, Kansas City Mo. or Model SB7 by Swedish Brake Technology Landskrona Sweden; a wrap spring clutch arranged on an external diameter, where the wrap spring drives in the wind-up direction (an example is the Model ASA-5® slack adjuster offered by Bendix Spicer Foundation Brake LLC of Elyria, Ohio); or a saw-tooth dog clutch, arranged such that saw-tooth shaped teeth engage a corresponding teeth surface in one direction, and push away from each other to slip past in the other direction. The latter arrangement is a preferred mechanism, because it employs positive drive in place of friction employed by the wrap spring type. Automatic Slack adjusters using the saw-tooth dog clutch typically have located the saw-tooth dog clutch coaxially with the adjuster's worm shaft (an example is offered by Madras Engineering Industries of India); or coaxially with the adjuster screw (an example is the Model S-ABA design offered by Haldex Commercial Vehicle Systems of Kansas City Mo.).

Adjusters with wrap spring-type clutches, particularly the internal diameter wrap spring type, have the disadvantage of reliance on friction resulting in randomly varying slip prior to engagement. Consequently they require expensive lubricants (i.e. costly high performance specialty greases) to ensure reliable adjustment. Previous saw-tooth dog clutches tend to be complicated and expensive to manufacture.

In view of the foregoing, it is an objective of the present invention to provide an improved automatic slack adjuster with the one-way clutch built within the anchor unit of the adjuster, in a manner which reduces cost and eases manufacture.

In addressing these and other objectives, the present invention provides a solution to the problems of the prior art with a design in which a saw-tooth dog clutch is built within the reference unit or anchor unit of an automatic slack adjuster which is integrated with the side cover of the automatic slack adjuster body. In effect, the reference gear wheel of the unit is split into two parts with co-axial restraint, enabling the design of a radial engagement dog-clutch. This novel arrangement also permits finer slack adjustments by use of a larger number of teeth on the anchor unit, thereby permitting finer, more accurate and consistent movement of the brake camshaft per unit angle of slack adjuster motion. This arrangement further allows for simplified manufacture because the saw-tooth dog clutch may be dovetailed into an existing flaring operation, lowering the cost of manufacture because the dog teeth are located on an internal diameter of a component of the anchor unit in a position where they can be broached at reduced cost. Further, previous designs of saw-tooth clutch have the teeth on the face of a wheel which have to be cut by milling or a similar process. The arrangement provides substantially increased torque capacity to overcome the friction between the worm gear and the body of the adjuster, which is a major factor affecting the functional performance of the adjuster. This provides the opportunity to further reduce cost by permitting use of lubricants which are less expensive than the previously used low friction-coefficient greases.

In a preferred embodiment of the present invention, the reference gear wheel is split into two parts, with co-axial restraint, thereby enabling the use of a radial engagement dog clutch.

The improvements of the present invention are made more clear in comparison with examples of previous slack adjusters. For example, U.S. Pat. No. 4,621,714 shows a slack adjuster with a rotating clutch and opposing teeth, in which the clutch engages teeth on an adjustment member and, because of the tooth shape, is only allowed to rotate counter-clockwise. However, in this arrangement, the toothed clutch engagement is external at the adjuster screw, not within the center gear on the anchor pin as in the present invention.

U.S. Pat. No. 7,198,138 shows a worm gear with an integrated ratchet cylinder to perform the one-way clutch function. The present invention achieves further manufacturing advantages and finer adjustment by incorporating the clutch into the anchor pin portion and not the worm gear.

U.S. Pat. No. 3,444,758 shows a slack adjuster where the worm wheel and worm gear teeth have asymmetrical profiles. The profile prevents large braking forces from wedging the worm gear and worm wheel away from each other. The toothed engagement is external to the gear, not internal as in the present invention.

U.S. Pat. No. 3,901,357 shows an automatic slack adjuster which also allows externally-accessible manual adjustments through its arrangement of springs. The present invention does not provide access to the clutch for manual adjustments.

U.S. Pat. No. 4,561,523 shows an automatic slack adjuster that includes both a back-off sleeve and adjustment shaft which permit the slack adjuster to maintain brake clearance by either increasing or decreasing the distance between the drum and the lining. Unlike the present invention, the clutch is still part of the adjuster screw mechanism.

U.S. Pat. No. 4,718,522 shows an automatic slack adjuster with a one way coupling in the form of a wrap spring on the worm shaft. The present invention does not use a wrap spring.

U.S. Patent Publication No. US2007/0012529 shows a toothed gear portion where the gears are made from ceramic material to improve wear characteristics, but does not disclose any of the adjuster arrangements of the present invention.

Other objects, advantages and novel features of the present invention will become apparent from the following detailed description of the invention when considered in conjunction with the accompanying drawings.

DETAILED DESCRIPTION OF THE DRAWINGS

Figure 1:
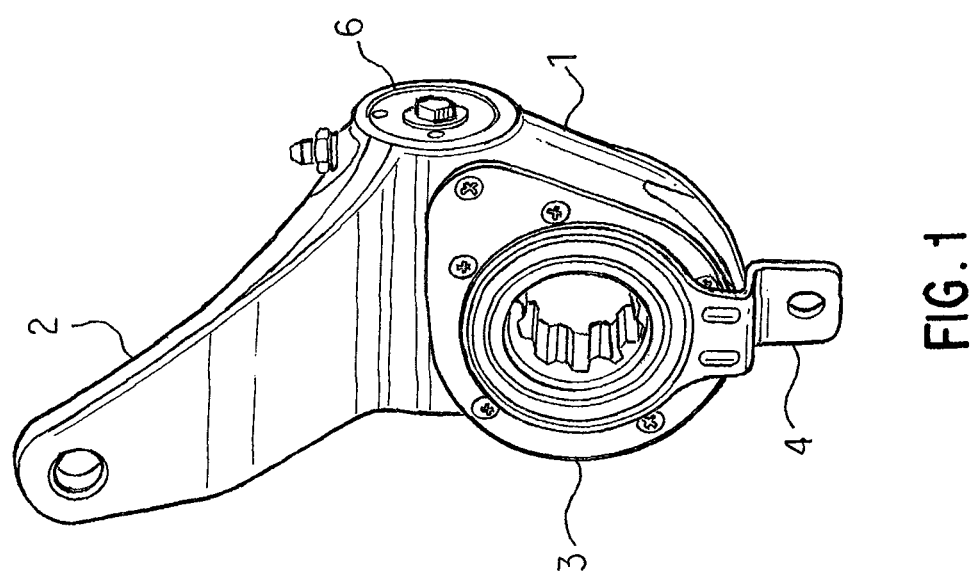
FIGS. 1a and 1b are oblique views of an assembled and partially-disassembled automatic slack adjuster in accordance with an embodiment of the present invention.

FIG. 1 is an oblique view of an assembled automatic slack adjuster having a housing 1, a brake actuator arm 2 which receives an end of a brake actuator pushrod (not illustrated), and a reference arm 3 which is affixed to the vehicle axle at tab 4 to provide a rotationally-fixed reference point. The automatic slack adjuster includes a splined opening 5 which receives corresponding splines of a brake camshaft (not illustrated for clarity). The illustrated automatic slack adjuster includes a housing portion 6, which contains a worm shaft 7 and adjuster unit 8 shown in FIG. 4. The worm shaft 7 engages corresponding worm wheel 9 (also referred to as a worm gear), whose inner circumference carries the splines of opening 5. The adjuster unit 8 and worm shaft 7 cooperated to function as an adjuster drive (also known as a self-setting drive in the art), such that rotation of the worm shaft 7 rotates the worm wheel 9 within the housing 1.

Figure 2:
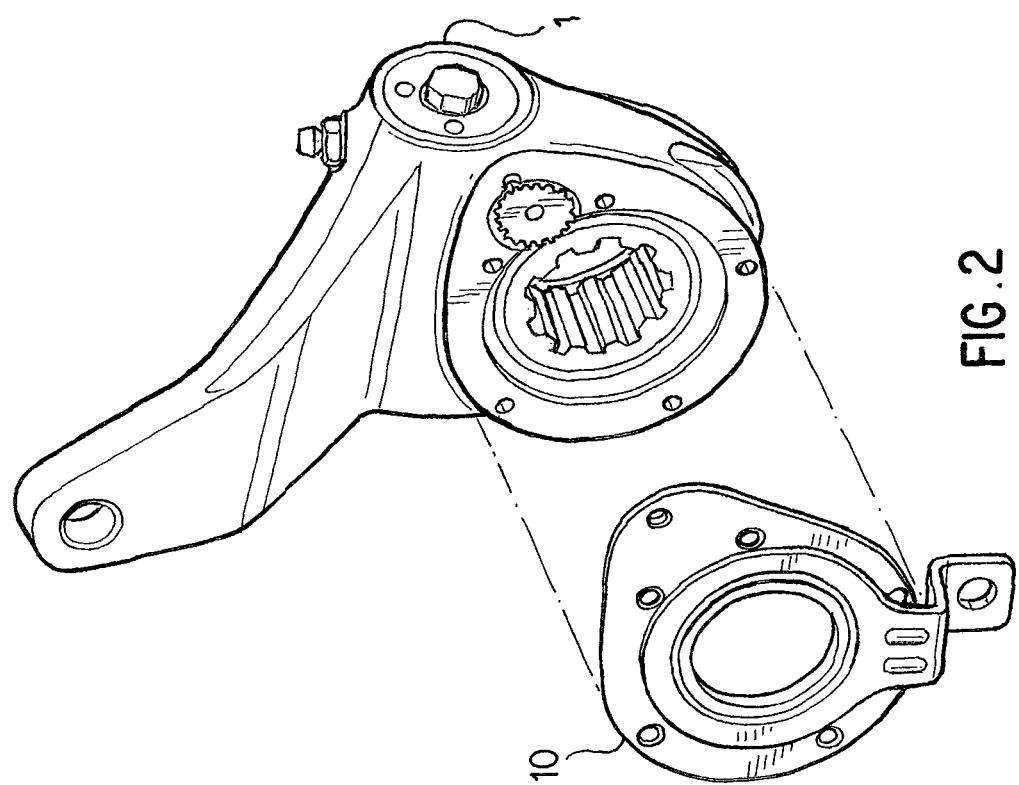
FIG. 2 is an oblique view of a portion of the one-way clutch assembly separated from the housing of the automatic slack adjuster shown in FIG. 1.
Figure 3:
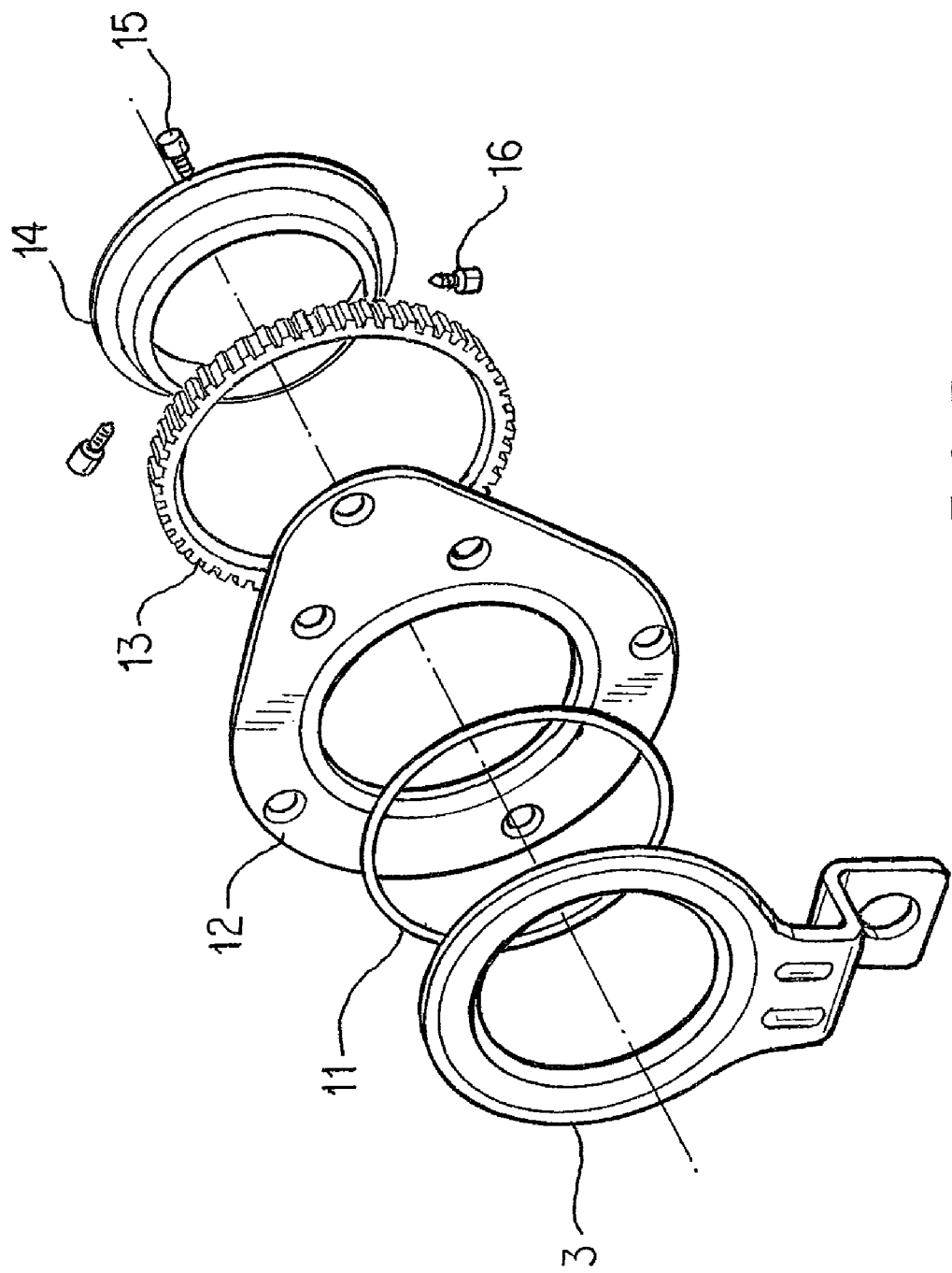
FIG. 3 is an exploded view of the separated portion of the one-way clutch assembly shown in FIG. 2.
Figure 4:
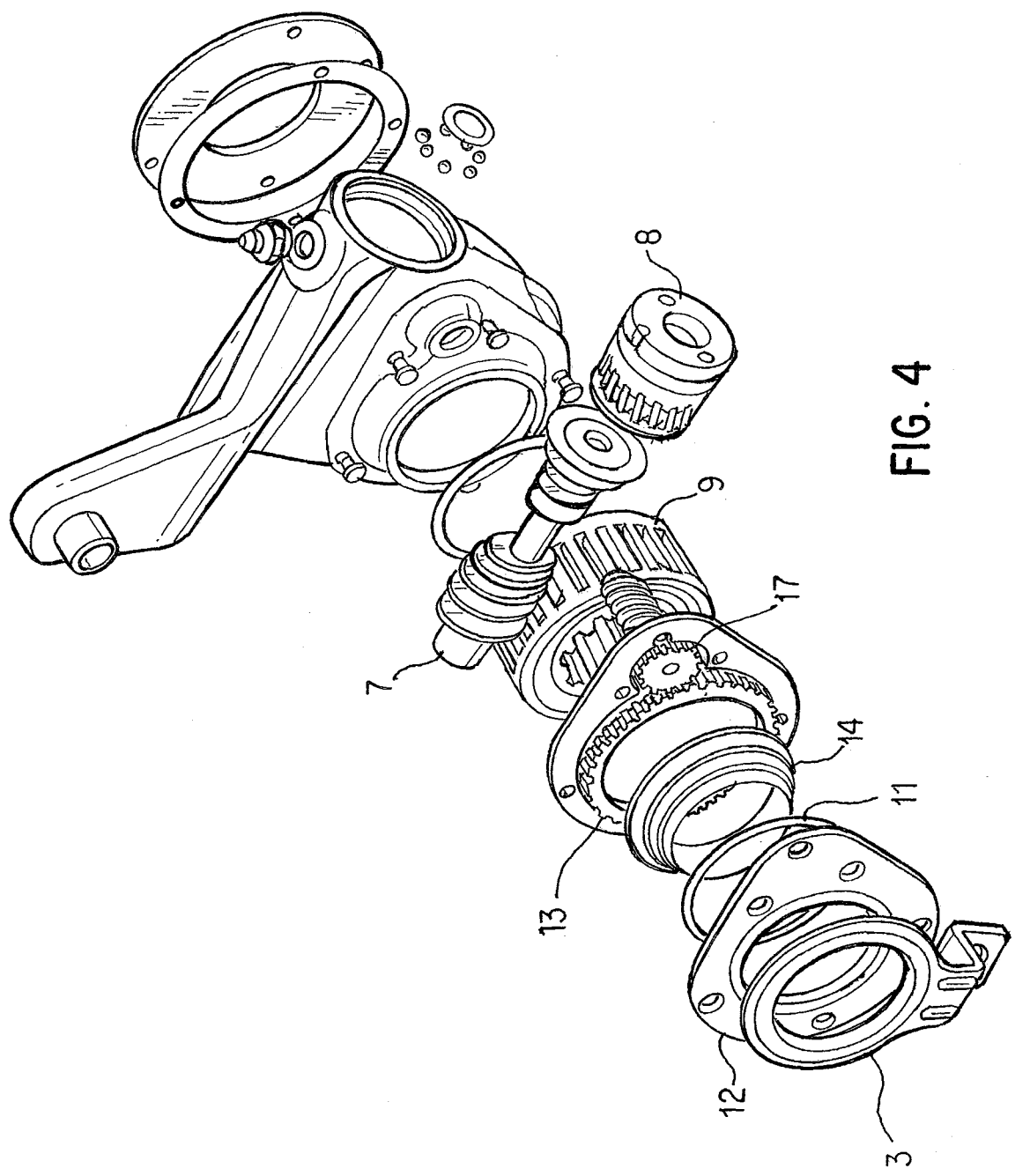
FIG. 4 is an exploded view of the automatic slack adjuster shown in FIG. 1, with an exploded view of the components of the one-way clutch assembly of FIG. 3.
Figure 5D:
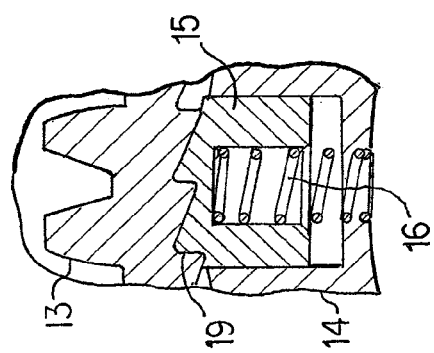
FIGS. 5a-5d provide cross-section and detailed views of a portion of the one-way clutch assembly of the automatic slack adjuster shown in FIG. 1.
Figure 5C:
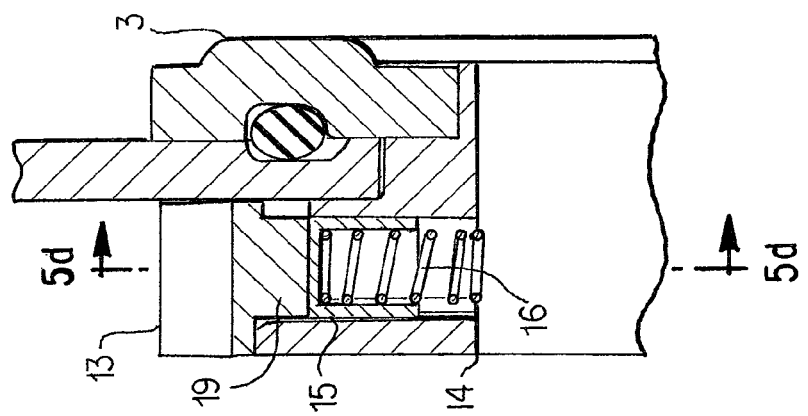
Figure 5B:
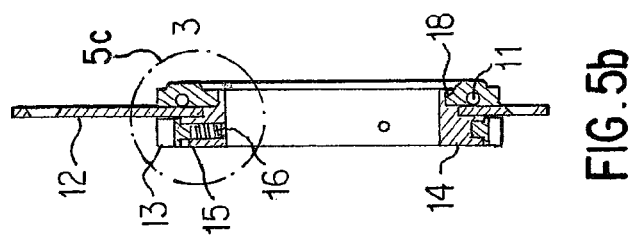
Figure 5A:
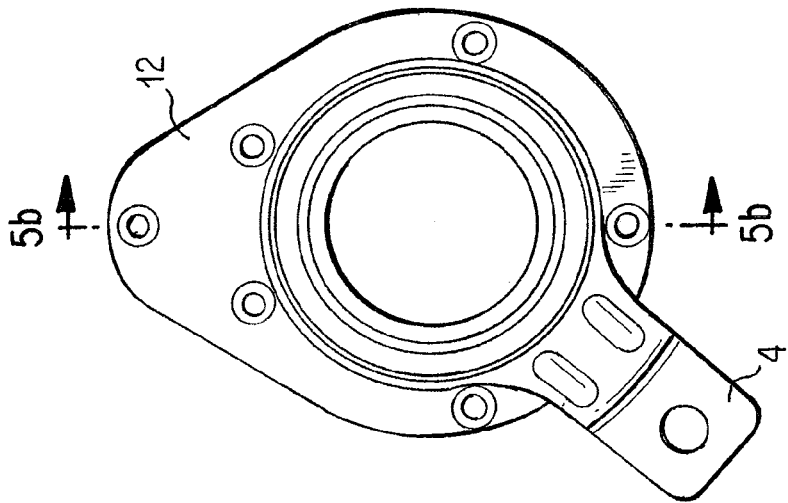

The inventive one-way clutch assembly 10 in this embodiment is shown in FIG. 2 separated from the housing 1. FIGS. 3 and 4 show exploded view of the one-way clutch unit 10, which includes reference arm 3, o-ring 11 provided to exclude environmental contaminates and prevent release of lubricant from the automatic slack adjuster, side plate 12, gear wheel 13, and support bracket, preferably in the form of a support ring 14, which receives and retains one-way clutch pawls 15 and their respective biasing springs 16. In this embodiment, three pawls 15 are provided at equal intervals about the circumference of support ring 14, however, one of ordinary skill will recognize that the number and spacing of the pawl(s) may be varied, so long as the one-way clutch action is provided by the pawl(s). Preferably, the pawls have two teeth, so as to better mate with the gear and improve the strength of the design Further details of this embodiment of the one-way clutch arrangements are shown in FIG. 5. FIG. 5a is an elevation view of the one-way clutch assembly 10, with side plate 12 and reference arm tab 4 visible. Section A-A is the cross-section view illustrated in FIG. 5b, showing the assembled combination of reference arm 3, o-ring 11, side plate 12, gear wheel 13, support ring 14, and a pawl 15 and biasing spring 16 located in support ring 14. The support ring 14 and the reference arm 3 are joined, in this embodiment by welding, about their mating circumference 18. Once assembled in this manner, the support ring 14 is held in a non-rotational manner to reference arm 3 with the gear wheel 13 and side plate 12 captured between the support ring and arm. The gear wheel 13 is free to rotate on support ring 14, however, as shown in FIGS. 5c and 5d, pawl 15 is biased against the uni-directional teeth 19 on the inner circumference of gear wheel 13 by biasing spring 16, so that the gear wheel 13 may freely rotate in one direction, but is prevented from rotating in the other direction.

When the one-way clutch assembly 10 is assembled to the housing 1, the gear wheel 13 engages an adjustment screw 17 laying in housing 1 transverse to the longitudinal axis of worm shaft 7. The adjustment screw 17 cooperates with corresponding worm threads on adjuster unit 8, such that when the brake actuator pushrod acts through the automatic slack adjuster to rotate the brake camshaft and then returns to its rest position, the one-way clutch pawls 15 allow the gear wheel to rotate relative to the reference arm in one direction, but lock the gear wheel 13 to the support ring 14 and reference arm 3 to prevent gear wheel rotation in the other direction. Thus, when the brake is applied and housing 1 rotates relative to reference arm 3, gear wheel 13 is permitted to rotate with the housing 1, thereby preventing the gear wheel from rotating adjusting screw 17 and adjuster unit 8 (the power spring within adjuster unit 8 creating sufficient friction drag to prevent rotation of the unit and adjusting screw 17, thereby causing gear wheel 13 to rotate on support ring 14 as housing 1 rotates relative to reference arm 3).

In contrast, when the brake is released, the pawls 15 lock the gear wheel 13 to the support ring 14 so that there is no gear wheel motion relative to reference arm 3. As a result, as the automatic slack adjuster returns to its rest position (a motion which results in the housing 1 rotating relative to the reference arm 3), the adjustment screw 17 rotates as it moves along the circumference of locked gear wheel 13. The rotation of adjustment screw 17 in turn rotates adjustment device 8, thereby removing excess slack in the brake, i.e., reducing the amount of travel required for the housing 1 to rotate the brake camshaft and cause the brake to engage. An advantage of the present invention is that the location of the pawls 15 and gear wheel 13 inner teeth permits the use of teeth with a very small pitch, a feature which can provide fine adjustment motion. Preferably, the number of teeth for this design is 60.

The foregoing disclosure has been set forth merely to illustrate the invention and is not intended to be limiting. Because such modifications of the disclosed embodiments incorporating the spirit and substance of the invention may occur to persons skilled in the art, the invention should be construed to include everything within the scope of the appended claims and equivalents thereof.

What is claimed is:

1. An automatic slack adjuster, comprising:
a housing, the housing having
an aperture for receiving a brake camshaft,
a worm wheel co-axially located within the housing aperture and configured to co-axially engage the brake camshaft in a manner which precludes rotation of the worm wheel relative to the brake camshaft, and
an adjuster drive arranged to rotate the worm wheel relative to the housing;
a brake actuator arm, the brake actuator arm being arranged to receive a brake actuator pushrod such that motion of the brake actuator pushrod causes the housing to rotate about a rotation axis of the worm wheel; and
a one-way clutch assembly, the one-way clutch assembly having
a reference arm arranged to be affixed to a vehicle axle and, containing an aperture for receiving the brake camshaft,
a support bracket affixed to the reference arm in a non-rotating manner,
a side plate and a gear wheel co-axially captured between the reference arm and the support bracket such, that the side plate and the gear wheel are rotatable about a common axis, and
at least one one-way pawl, the at least one one-way pawl located in the support bracket and biased in a radially-outward direction against one-way teeth formed on an inner radius of the gear wheel, such that the at least one pawl permits rotation of the gear wheel in a first rotation direction and inhibits gear wheel rotation in a second rotation direction,
wherein
the one-way clutch assembly side plate is affixed to the housing such that the reference arm aperture is co-axial with the housing aperture, and
gear teeth on an outer circumference of the one-way clutch gear wheel engage an adjustment screw which transfers gear wheel motion to the adjuster drive.

2. The automatic slack adjuster of claim 1, wherein
the adjuster drive comprises a worm shaft having worm threads which engage corresponding worm gear teeth on the worm wheel and an adjuster unit; and
the adjustment screw includes a shaft portion with worm threads which engage corresponding worm gear teeth on the adjuster unit, such that when the one-way clutch gear wheel rotates the adjustment screw, the adjustment screw rotates the adjuster unit, the adjuster unit rotates the worm shaft, and the worm shaft rotates the worm wheel relative to the housing.

3. The automatic slack adjuster of claim 1, wherein
the one-way clutch assembly further comprises a seal located between the reference arm and the side plate arranged to inhibit passage of environmental contaminants into the one-way clutch assembly.

4. A vehicle brake, comprising:
a brake actuator having a brake actuation pushrod;
a brake arranged to be located on an axle of a vehicle and having a brake camshaft, the brake camshaft having a first end located at the brake and a second end distal from the brake, wherein rotation of the brake camshaft about a longitudinal axis actuates the brake; and
an automatic slack adjuster coupled between the brake actuator pushrod and the brake camshaft to transfer motion of the pushrod to rotation of the brake camshaft, the automatic slack adjuster comprising:
a housing; the housing having
an aperture for receiving the brake camshaft,
a worm wheel co-axially located within the housing aperture and configured to co-axially engage the brake camshaft in a manner which precludes rotation of the worm wheel relative to the brake camshaft, and
an adjuster drive arranged to rotate the worm wheel, relative to the housing;
a brake actuator arm, the brake actuator arm being arranged to receive the brake actuator pushrod; and
a one-way clutch assembly, the one-way clutch assembly having
a reference arm arranged to be affixed to the vehicle axle and containing an aperture for receiving the brake camshaft,
a support bracket affixed to the reference arm in a non-rotating manner,
a side plate and a gear wheel co-axially captured between the reference arm and the support bracket such that the side plate and the gear wheel are rotatable about a common axis, and
at least one one-way pawl, the at, least one one-way pawl located in the support bracket and biased in a radially-outward direction against one-way teeth formed on an inner radius of the gear wheel, such that the at least one pawl permits rotation of the gear wheel in a first rotation direction and inhibits gear wheel rotation in a second rotation direction,
wherein
the one-way clutch assembly side plate is affixed to the housing such that the reference arm aperture is co-axial with the housing aperture, and
gear teeth on an outer circumference of the one-way clutch gear wheel engage an adjustment screw which transfers gear wheel motion to the adjuster drive.

5. The automatic slack adjuster of claim 4, wherein
the adjuster drive comprises a worm shaft having worm threads which engage corresponding worm gear teeth on the worm wheel and an adjuster unit, and
the adjustment screw includes a shaft portion with worm threads which engage corresponding worm gear teeth on the adjuster unit, such that when the one-way clutch gear wheel rotates the adjustment screw, the adjustment screw rotates the adjuster unit, the adjuster unit rotates the worm shaft, and the worm shaft rotates the worm wheel relative to the housing.

6. The automatic slack adjuster of claim 4, wherein the one-way clutch assembly further comprises a seal located between the reference arm and the side plate arranged to inhibit passage of environmental contaminants into the one-way clutch assembly.

7. A vehicle, comprising:
at least one axle having a brake, the brake including
   a brake actuator having a brake actuation pushrod;
   a brake arranged to be located on an axle of the vehicle and having a brake camshaft, the brake camshaft having a first end located at the brake and a second end distal from the brake, wherein rotation of the brake camshaft about a longitudinal axis actuates the brake; and
   an automatic slack adjuster coupled between the brake actuator pushrod and the brake camshaft to transfer motion of the pushrod to rotation of the brake camshaft, the automatic slack adjuster comprising:
      a housing, the housing having
         an aperture for receiving the brake camshaft,
         a worm wheel co-axially located within the housing aperture and configured to co-axially engage the brake camshaft in a manner which precludes rotation of the worm wheel relative to the brake camshaft, and
         an adjuster drive arranged to rotate the worm wheel relative to the housing;
      a brake actuator arm, the brake actuator arm being arranged to receive the brake actuator pushrod; and
      a one-way clutch assembly, the one-way clutch assembly having a reference arm arranged to be affixed to the vehicle axle and containing an aperture for receiving the brake camshaft,
         a support bracket affixed to the reference arm in a non-rotating manner,
         a side plate and a gear wheel co-axially captured between the reference arm and the support bracket such that the side plate and the gear wheel are rotatable about a common axis, and
         at least one one-way pawl, the at least one one-way pawl located in the support bracket and biased in a radially-outward direction against one-way teeth formed on an inner radius of the gear wheel, such that the at least one pawl permits rotation of the gear wheel in a first rotation direction and inhibits gear wheel rotation in a second rotation direction,
      wherein
         the one-way clutch assembly side plate is affixed to the housing such that the reference arm aperture is co-axial with the housing aperture, and
         gear teeth on an outer circumference of the one-way clutch gear wheel engage an adjustment screw which transfers gear wheel motion to the adjuster drive.

8. A one-way clutch assembly for an automatic slack adjuster, comprising:
   a reference arm arranged to be affixed to a vehicle axle and containing an aperture for receiving a brake camshaft,
   a support bracket affixed to the reference arm in a non-rotating manner,
   a side plate configured to be located, on a slack adjuster housing and a gear wheel, both the side plate and the gear wheel being co-axially captured between the reference arm and the support bracket such that the side plate and the gear wheel are rotatable about a common axis, and
   at least one one-way pawl, the at least one one-way pawl located in the support bracket and biased in a radially-outward direction against one-way teeth formed on an inner radius of the gear wheel, such that the at least one pawl permits rotation of the gear wheel in a first rotation direction and inhibits gear wheel rotation in a second rotation direction,
wherein
   when the one-way clutch assembly side plate is affixed to the slack adjuster housing, the reference arm aperture is co-axial with a corresponding housing aperture, and
   gear teeth on an outer circumference of the one-way clutch gear wheel are configured to engage an adjustment screw located in the slack adjuster housing to transfer gear wheel motion to an adjuster drive.

* * * * *